US012659684B2

(12) United States Patent
Zamani et al.

(10) Patent No.: US 12,659,684 B2
(45) Date of Patent: Jun. 16, 2026

(54) OBJECT AUDIO CODING

(71) Applicant: Apple Inc., Cupertino, CA (US)

(72) Inventors: Sina Zamani, Cupertino, CA (US); Moo Young Kim, San Diego, CA (US); Dipanjan Sen, Dublin, CA (US); Sang Uk Ryu, San Diego, CA (US); Juha O. Merimaa, San Mateo, CA (US); Symeon Delikaris Manias, Los Angeles, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 18/454,508

(22) Filed: Aug. 23, 2023

(65) Prior Publication Data

US 2024/0098444 A1 Mar. 21, 2024

Related U.S. Application Data

(60) Provisional application No. 63/376,520, filed on Sep. 21, 2022, provisional application No. 63/376,523, filed on Sep. 21, 2022.

(51) Int. Cl.

| | |
|---|---|
| ***H04S 7/00*** | (2006.01) |
| ***G10L 19/008*** | (2013.01) |
| ***G10L 19/16*** | (2013.01) |
| ***G10L 25/03*** | (2013.01) |
| ***H04S 3/00*** | (2006.01) |

(52) U.S. Cl.

CPC ............ *H04S 7/303* (2013.01); *G10L 19/008* (2013.01); *G10L 19/167* (2013.01); *G10L 25/03* (2013.01); *H04S 3/008* (2013.01); *H04S 2420/11* (2013.01)

(58) Field of Classification Search

None

See application file for complete search history.

(56) References Cited

U.S. PATENT DOCUMENTS

| | | | | |
|---|---|---|---|---|
| 10,827,295 | B2 | 11/2020 | Boehm et al. | |
| 11,606,661 | B2 | 3/2023 | Vilkamo et al. | |
| 11,798,569 | B2 | 10/2023 | Kim et al. | |
| 12,183,358 | B2 | 12/2024 | Vilkamo et al. | |
| 2020/0105282 | A1* | 4/2020 | Kim | H04R 5/04 |
| 2020/0120438 | A1* | 4/2020 | Kim | H04S 3/008 |
| 2020/0260206 | A1 | 8/2020 | Vilkamo et al. | |
| 2021/0343300 | A1* | 11/2021 | Küch | G10L 19/008 |
| 2023/0075488 | A1* | 3/2023 | Teng | G06F 3/013 |

(Continued)

FOREIGN PATENT DOCUMENTS

WO 2022079044 A1 4/2022

OTHER PUBLICATIONS

Pulkki et al., "Parametric Time-Frequancy Domain Spatial Audio", received from https://ieeexplore.ieee.org/book/8320443, 2018, 40 pages.

(Continued)

*Primary Examiner* — Qin Zhu

(74) *Attorney, Agent, or Firm* — Aikin & Gallant, LLP

(57) ABSTRACT

In one aspect, a computer-implemented method, includes obtaining object audio and metadata that spatially describes the object audio, converting the object audio to Ambisonics audio based on the metadata, encoding, in a first bit stream, the Ambisonics audio, and encoding, in a second bit stream, at least a subset of the metadata.

18 Claims, 6 Drawing Sheets

(56) References Cited

U.S. PATENT DOCUMENTS

| | | | |
|---|---|---|---|
| 2023/0410823 A1 | 12/2023 | Vasilache | |
| 2024/0355341 A1* | 10/2024 | Laitinen ................ | G10L 19/008 |

OTHER PUBLICATIONS

Politis et al., "Compass: Coding and Multidirectional Parameterization of Ambisonic Sound Scenes" received from https://ieeexplore.ieee.org/document/8462608, Apr. 15-20, 2018, 5 pages.

* cited by examiner

OBJECT AUDIO CODING

This nonprovisional patent application claims the benefit of the earlier filing date of U.S. provisional application 63/376,520 filed Sep. 21, 2022 and 63/376,523 filed Sep. 21, 2022.

FIELD

This disclosure relates to techniques in digital audio signal processing and in particular to encoding or decoding of object audio in an Ambisonics domain.

BACKGROUND

A processing device, such as a computer, a smart phone, a tablet computer, or a wearable device, can output audio to a user. For example, a computer can launch an audio application such as a movie player, a music player, a conferencing application, a phone call, an alarm, a game, a user interface, a web browser, or other application that includes audio content that is played back to a user through speakers. Some audio content may include an audio scene with spatial qualities.

An audio signal may include an analog or digital signal that varies over time and frequency to represent a sound or a sound field. The audio signal may be used to drive an acoustic transducer (e.g., a loudspeaker) that replicates the sound or sound field. Audio signals may have a variety of formats. Traditional channel-based audio is recorded with a listening device in mind, for example, 5.1 home theater has five speakers and one subwoofer which are placed in assigned locations. Object audio encodes audio sources as "objects." Each object may have associated metadata that describes spatial information about the object. Ambisonics is a full-sphere surround sound format that covers sound in the horizontal plane, as well as sound sources above and below the listener. With Ambisonics, a sound field is decomposed into spherical harmonic components.

SUMMARY

In some aspects, a computer-implemented method includes obtaining object audio and metadata that spatially describes the object audio; converting the object audio to time-frequency domain Ambisonics audio based on the metadata; and encoding the time-frequency domain Ambisonics audio and a subset of the metadata as one or more bit streams to be stored in computer-readable memory or transmitted to a remote device.

In some examples, the time-frequency domain Ambisonics audio includes a plurality of time-frequency tiles, each tile of the plurality of time-frequency tiles representing audio in a sub-band of an Ambisonics component. Each tile of the plurality of time-frequency tiles may include a portion of the metadata that spatially describes a corresponding portion of the object audio in the tile. The time-frequency domain Ambisonics audio may include a set of the plurality of time-frequency tiles that corresponds to an audio frame of the object audio.

In some aspects, a computer-implemented method includes decoding one or more bit streams to obtain a time-frequency domain Ambisonics audio and metadata; extracting object audio from the time-frequency domain Ambisonics audio using the metadata which spatially describes the object audio; and rendering the object audio with the metadata based on a desired output layout. In some examples, the object audio is extracted directly from the time-frequency domain Ambisonics audio using the metadata. In other examples, extracting the object audio includes converting the time-frequency domain Ambisonics audio to time domain Ambisonics audio, and extracting the object audio from the time domain Ambisonics audio using the metadata.

In some aspects, a computer-implemented method, includes obtaining object audio and metadata that spatially describes the object audio; converting the object audio to Ambisonics audio based on the metadata; encoding, in a first bit stream, the Ambisonics audio (e.g., as time-frequency domain Ambisonics audio); and encoding, in a second bit stream, a subset of the metadata. The subset of the metadata may be used by a decoder to convert the Ambisonics audio back to the object audio.

In some aspects, a computer-implemented method includes decoding a first bit stream to obtain Ambisonics audio (e.g., as time-frequency domain Ambisonics audio); decoding a second bit stream to obtain metadata; extracting object audio from the Ambisonics audio using the metadata which spatially describes the object audio; and rendering the object audio with the metadata based on a desired output layout.

In some aspects, a computer-implemented method includes converting object audio to time-frequency domain Ambisonics audio based on metadata that spatially describes the object audio, wherein the object audio is associated with a first priority; converting second object audio to time domain Ambisonics audio wherein the second object audio is associated with a second priority that is different from the first priority; encoding the time-frequency domain Ambisonics audio as a first bit stream; encoding the metadata as a second bit stream; and encoding the time domain Ambisonics audio as a third bit stream. The first priority may be a higher priority than the second priority. The time domain Ambisonics audio may be encoded with a lower resolution than the time-frequency domain Ambisonics audio.

Aspects of the present disclosure may be computer-implemented methods that are performed by a processing device or processing logic which may comprise hardware (e.g., circuitry, dedicated logic, programmable logic, a processor, a processing device, a central processing unit (CPU), a system-on-chip (SoC), machine-readable memory, etc.), software (e.g., machine-readable instructions stored in a machine-readable medium such as memory and to be executed by a processor or processing logic), or a combination thereof.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
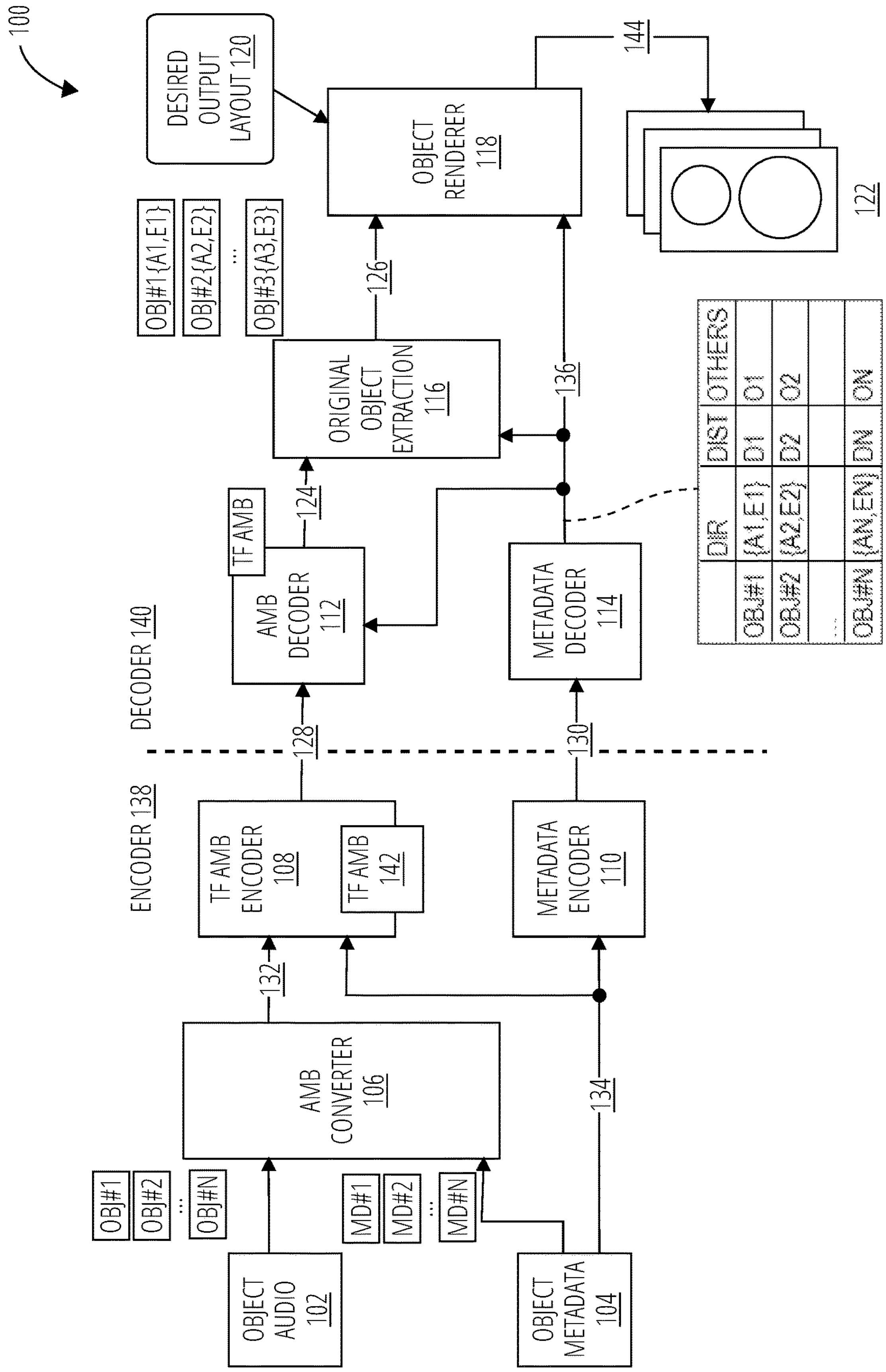
FIG. 1 illustrates an example system for coding object audio with a time-frequency domain Ambisonics audio format, in accordance with some aspects.

Humans can estimate the location of a sound by analyzing the sounds at their two ears. This is known as binaural hearing and the human auditory system can estimate directions of sound using the way sound diffracts around and reflects off of our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones. Spatial audio can be rendered for playback, so that the audio is perceived to have spatial qualities, for example, originating from a location above, below, or to the side of a listener.

The spatial audio may correspond to visual components that together form an audiovisual work. An audiovisual work may be associated with an application, a user interface, a movie, a live show, a sporting event, a game, a conferencing call, or other audiovisual experience. In some examples, the audiovisual work may be integral to extended reality (XR) environment and sound sources of the audiovisual work may correspond to one or more virtual objects in the XR environment. An XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many distinct types of electronic systems can enable a user to interact with and/or sense an XR environment. A non-exclusive list of examples include heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as microLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface). Immersive experiences such as an XR environment, or other audio works, may include spatial audio.

Spatial audio reproduction may include spatializing sound sources in a scene. The scene may be a three-dimensional representation which may include position of each sound source. In an immersive environment, a user may, in some cases, be able to move around and interact in the scene. Each sound source in a scene may be characterized by an object in object audio.

Object audio or object-based audio may include one or more audio signals and metadata that is associated with each of the objects. Examples of object audio include DTS:X or Dolby Atmos. Metadata may define whether or not the audio signal is an object (e.g., a sound source) and include spatial information such as an absolute position of the object, a relative direction from a listener (or listening position) to the object, a distance from the object to the listener (or listening position), or other spatial information or combination thereof. The metadata may include other audio information as well. Each audio signal with spatial information may be treated as an 'object' or sound source in an audio scene and rendered according to a desired output layout.

A renderer may render an object using its spatial information to impart spatial cues in the resulting spatial audio to give the impression that the object has a location corresponding to the spatial information. For example, an object representing a bird may have spatial information that indicates the bird is high above the user's right side. The object may be rendered with spatial cues so that the resulting spatial audio signal gives this impression when output by a speaker (e.g., through a left and right speaker of a headphone). Further, by changing the spatial information of the metadata over time, objects in an audio scene may move.

Ambisonics relates to a technique for recording, mixing, and playing back three-dimensional 360-degree audio both in the horizontal and/or vertical plane. Ambisonics treats an audio scene as a 360-degree sphere of sound coming from different directions around a center. An example of an Ambisonics format is B-format, which can include first order Ambisonics consisting of four audio components—W, X, Y and Z. Each component can represent a different spherical harmonic component, or a different microphone polar pattern, pointing in a specific direction, each polar pattern being conjoined at a center point of the sphere.

Ambisonics has an inherently hierarchical format. Each increasing order (e.g., first order, second order, third order, and so on) adds spatial resolution when played back to a listener. Ambisonics can be formatted with just the lower order Ambisonics, such as with first order, W, X, Y, and Z. This format, although having a low bandwidth footprint, provides low spatial resolution. Much higher order Ambisonics components are typically applied for high resolution immersive spatial audio experience.

Ambisonics audio can be extended to higher orders, increasing the quality or resolution of localization. With increasing each order, additional Ambisonics components are introduced. For example, 5 new components are introduced in Ambisonics audio for second order Ambisonics audio. For third order Ambisonics audio, 7 additional components are introduced, and so on. With traditional Ambisonics audio (which may be referred to herein as time domain Ambisonics), this can cause the footprint or size of the audio information to grow, which can quickly run up against bandwidth limitations. As such, simply converting object audio to Ambisonics audio may run up against bandwidth limitations in order to meet a desired spatial resolution, if the order of the Ambisonics audio is high.

Aspects of the present disclosure describe a method or device (e.g., an encoder or decoder) that may encode and decode object audio in an Ambisonics audio domain. Metadata may be used to map between object audio and an Ambisonics audio representation of the object audio, to reduce the encoded footprint of the object audio.

In some aspects, object audio is encoded as time-frequency domain (TF) Ambisonics audio. In some aspects, in the decoding stage, the object audio is decoded as TF Ambisonics audio and converted back to object audio. In some examples, the time-frequency domain Ambisonics audio is directly decoded to object audio. In other examples, the time-frequency domain Ambisonics audio (TF Ambisonics audio) is converted to time domain (TD) Ambisonics audio, and then to object audio.

In some aspects, object audio is encoded as TD Ambisonics audio, and metadata is encoded in a separate bit stream. A decoder may use the object metadata to convert the TD Ambisonics audio back to object audio.

In some aspects, object audio is encoded as either TF Ambisonics audio or TD Ambisonics audio, based on a priority of the object audio. Objects that are associated with high priority may be encoded as TF Ambisonics audio, and objects that are not associated with high priority may be encoded as TD Ambisonics audio.

At the decoder, once the object audio is extracted from the received Ambisonics audio, the object audio may be rendered according to a desired output layout. In some examples, object audio may be spatialized and combined to form binaural audio that may include a left audio channel and a right audio channel. The left and right audio channels may be used to drive a left ear-worn speaker and a right ear-worn speaker. In other examples, object audio may be rendered according to a speaker layout format (e.g., 5.1, 6.1, 7.1, etc.).

FIG. 1 illustrates an example system 100 for coding object audio with a time-frequency domain Ambisonics audio format, in accordance with some aspects. Some aspects of the system may be performed as an encoder 138, and other aspects of the system may be performed as a decoder 140. Encoder 138 may include one or more processing devices that perform the operations described. Similarly, decoder 140 may include one or more processing devices that perform the operations described. Encoder 138 and decoder 140 may be communicatively coupled over a computer network which may include a wired or wireless communication hardware (e.g., a transmitter and receiver). The encoder 138 and decoder 140 may communicate through one or more network communication protocols such as an IEEE 702 based protocol and/or other network communication protocol.

At encoder 138, object audio 102 and metadata 104 that spatially describes the object audio 102 is obtained by the encoder 138. Object audio 102 may include one or more objects such as object 1, object 2, etc. Each object may represent a sound source in a sound scene. Object metadata 104 may include information that describes each object specifically and individually.

The encoder 138 may obtain object audio 102 and object metadata 104 as digital data. In some examples, encoder 138 may generate the object audio 102 and metadata 104 based on sensing sounds in a physical environment with microphones. In other examples, encoder 138 may obtain the object audio 102 and the metadata 104 from another device (e.g., an encoding device, a capture device, or an intermediary device).

The object audio 102 may be converted to time-frequency domain (TF) Ambisonics audio 142. For example, at Ambisonics converter block 106, the object audio 102 may be converted to time domain (TD) Ambisonics audio 132 based on the object metadata 104. TD Ambisonics audio may include an audio signal for each Ambisonics component of the TD Ambisonics audio that varies over time. TD Ambisonics audio may be understood as traditional Ambisonics audio or higher order Ambisonics (HOA). At block 108, the TD Ambisonics audio 132 may be converted to the TF Ambisonics audio 142. TF Ambisonics audio 142 may characterize the TD Ambisonics audio 132 and object audio 102 with a plurality of time-frequency tiles. As described further in other sections, each tile may uniquely characterize an Ambisonics component, a sub-band, and a time range of the object audio 102 and TD Ambisonics audio 132.

At block 108 and block 110, the TF Ambisonics audio 142 and a subset 134 of the metadata 104 may be encoded as one or more bit streams (e.g., bit stream 128 and bit stream 130), respectively. The bit stream 128 and bit stream 130 may be stored in computer-readable memory, and/or transmitted to a remote device such as, for example, a decoder 140 or an intermediary device that may pass the data to decoder 140.

Figure 5:
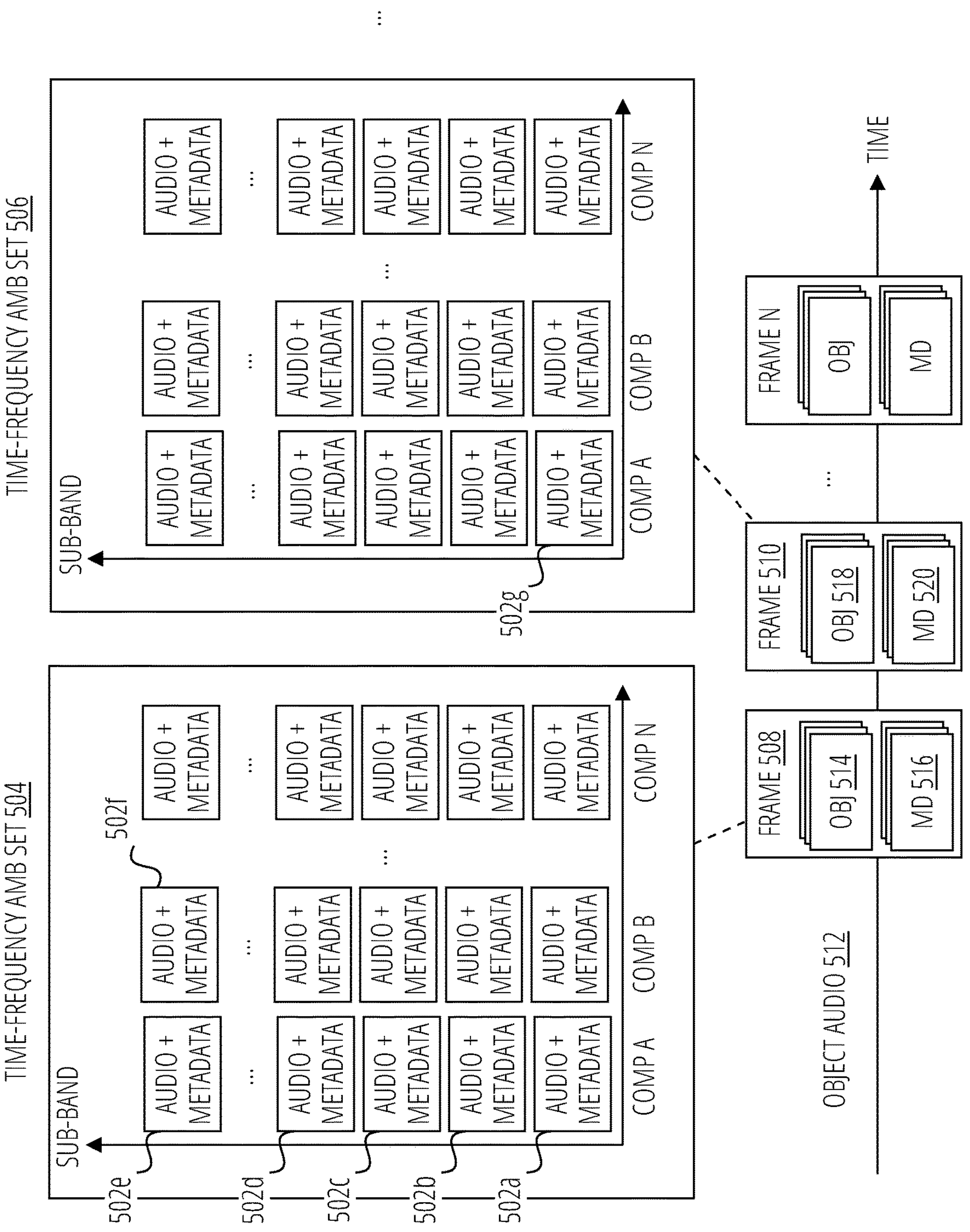
FIG. 5 shows an example of time-frequency domain Ambisonics audio, in accordance with some aspects.

The TF Ambisonics audio 142 may include a plurality of time-frequency tiles, each tile of the plurality of time-frequency tiles representing audio in a sub-band of an Ambisonics component. Each tile of the plurality of time-frequency tiles may include a portion of the metadata 104 that spatially describes a corresponding portion of the object audio in the tile. Further, the TF Ambisonics audio 142 may include a set of the plurality of time-frequency tiles that corresponds to an audio frame of the object audio. An example of TF Ambisonics audio is shown in FIG. 5.

At Ambisonics converter block 106 of FIG. 1, converting the object audio 102 to the TF Ambisonics audio may include converting the object audio 102 to TD Ambisonics audio 132, and encoding the time domain Ambisonics audio 132 as the TF Ambisonics audio 142, using the object metadata 104 or a subset 134 of the object metadata.

The TF Ambisonics audio 142 may be a compressed version of the TD Ambisonics audio 132. The TD Ambisonics audio 132 and TF Ambisonics audio 142 may include a higher order Ambisonics (HOA) component. For example, at Ambisonics converter block 106, object audio 102 may be converted to TD Ambisonics which may include first order Ambisonics components, second order Ambisonics components, and third order Ambisonics components. Each component beyond the first order may be understood as a HOA component and Ambisonics audio with more than one order may be referred to as higher-order Ambisonics (HOA) audio.

The metadata 104 and subset 134 may include spatial information of an object such as a direction, a distance, and/or a position. In some examples, the direction, distance, position, or other spatial information may be defined relative to a listener's position. The metadata may include other information about the object such as loudness, an object type, or other information that may be specific to the object.

At Ambisonics decoder block 112 of decoder 140, one or more bit streams such as bit streams 128 and 130 are decoded to obtain TF Ambisonics audio 124 and metadata 136. The TF Ambisonics audio 124 may be the same as the TF Ambisonics audio 142 that was encoded at encoder 138. Similarly, the metadata 136 may be the same as metadata subset 134 which was encoded at encoder 138.

At metadata decoder block 114, bit stream 130 may be decoded to obtain metadata 136. Metadata 136 may be the same as metadata subset 134 which was encoded into the bit stream 130 by encoder 138. The metadata 136 may be a quantized version of object metadata 104. The metadata 136 may comprise at least one of a distance or a direction that is associated with an object of the object audio. In some examples, the metadata 136 spatially describes every object in the object audio 126.

At block 116, object audio 126 may be extracted from the TF Ambisonics audio 124 using the metadata 136 which spatially describes the object audio. This object audio 126 may be a quantized version of object audio 102.

Quantization may be referred to as the process of constraining an input from a continuous or otherwise large set of values (such as the real numbers) to a discrete set (such as the integers). Quantized object audio 126 may include a coarser representation (e.g., less audio resolution) than the original object audio 102. This may include a down sampled version of an object's audio signal, or a version that has less granularity in the amplitude or phase of the audio signal. Similarly, a quantized version of the metadata may be a reduced version with less or courser information (e.g., lower spatial resolution) than the original object metadata 104.

In some aspects, as shown in FIG. 1, the object audio 126 is extracted directly from the TF Ambisonics audio 124 using the metadata. For example, the TF Ambisonics audio 124 is not first converted to TD Ambisonics audio (unlike the example in FIG. 2). Extracting the object audio at block 116 may include referencing the metadata information contained in each tile of the TF Ambisonics audio 124 to extract the relevant audio signal for each object and re-associating the direction from metadata 136 with each object to reconstruct the object audio 126. As such, the resulting object audio 126 may include each object from object audio 102, as well as a direction and/or distance for each object.

At object renderer block 118, the object audio 126 may be rendered with the metadata 136 based on a desired output layout 120. The desired output layout 120 may vary depending on the playback device and configuration of speakers 122, which may include a multi-speaker layout such as 5.1, 6.1, 7.1, etc., a headphone set, a head-worn device, or other audio playback output format. The resulting audio channels 144 generated by object renderer block 118 may be used to drive speakers 122 to output a sound scene that replicates that of the original object audio 102.

For example, the desired output layout 120 may include a multi-speaker layout with preset locations of speaker channels (e.g., center, front-left, front-right, or other speaker channels of a surround sound audio format). The object audio signals may be combined or mixed into the audio channels according to a rendering algorithm that distributes each of the object audio signals according to the spatial information contained in the object metadata at those preset locations.

In other examples, the desired output layout 120 may include a head-worn speaker layout that outputs binaural audio. In such a case, object renderer block 118 may include a binaural renderer that may apply HRTFs or HRIRs to the object audio 126 in accordance with the spatial information (e.g., direction and distance) contained in metadata 136. The resulting left and right audio channels may include spatial cues as imparted by the HRTFs or HRIRs to spatially output audio to a listener through left and right ear-worn speakers. Ear-worn speakers may be worn on, over, or in a user's ear.

In such a manner, object audio may be converted from and to an Ambisonics audio format, using the object metadata to encode, decode, and render the object audio. At the encoder 138, each time-frequency (TF) tile may be represented by a set (or multiple sets) of the audio signal and metadata. The metadata may include a direction, distance, or other audio or spatial information, or a combination thereof. The audio signals of object audio 102 and metadata 104 may be encoded and transmitted as a bit stream 128 as TF Ambisonics audio, together with a subset 134 of the original object metadata 104, which may be encoded and transmitted as bit stream 130.

At the decoder 140, a set (or multiple sets) of the object audio and metadata for each TF tile are reconstructed. A quantized version of the object metadata may be reconstructed at the metadata decoder block 114. Similarly, a quantized version of the object audio signals may be extracted at block 116 by using the set (or multiple sets) of the audio signal and metadata for each TF tile. Object renderer block 118 may synthesize the speaker or headphone output based on the quantized object audio 126, the quantized metadata 136, and the desired output layout 120 or other output channel layout information.

In some aspects, a method may be performed with various aspects described, such as with respect to FIG. 1. The method may be performed by processing logic of an encoder 138 or decoder 140, other audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

In a method, processing logic may obtain object audio 102 and metadata 104 that spatially describes the object audio. Processing logic may convert the object audio 102 to time-frequency domain Ambisonics audio (TF Ambisonics audio 142) based on the metadata subset 134 or the metadata 104 (e.g., at block 106 and block 108). Processing logic may encode the TF Ambisonics audio 142 and a subset 134 of the metadata 104 as one or more bit streams (e.g., bit stream 128 and bit stream 130) to be stored in computer-readable memory or transmitted to a remote device such as a decoder 140 or an intermediary device.

In another method, processing logic may decode one or more bit streams (e.g., bit stream 128 and bit stream 130) to obtain a time-frequency domain Ambisonics audio 124 and metadata 136. Processing logic may extract object audio 126 from the time-frequency domain Ambisonics audio 124 using the metadata 136 which spatially describes the object audio 126. Processing logic may render the object audio 126 with the metadata 136 based on a desired output layout 120. The object audio 126 may be extracted directly from the time-frequency domain Ambisonics audio 124 (e.g., at block 116) using the metadata 136.

Figure 2:
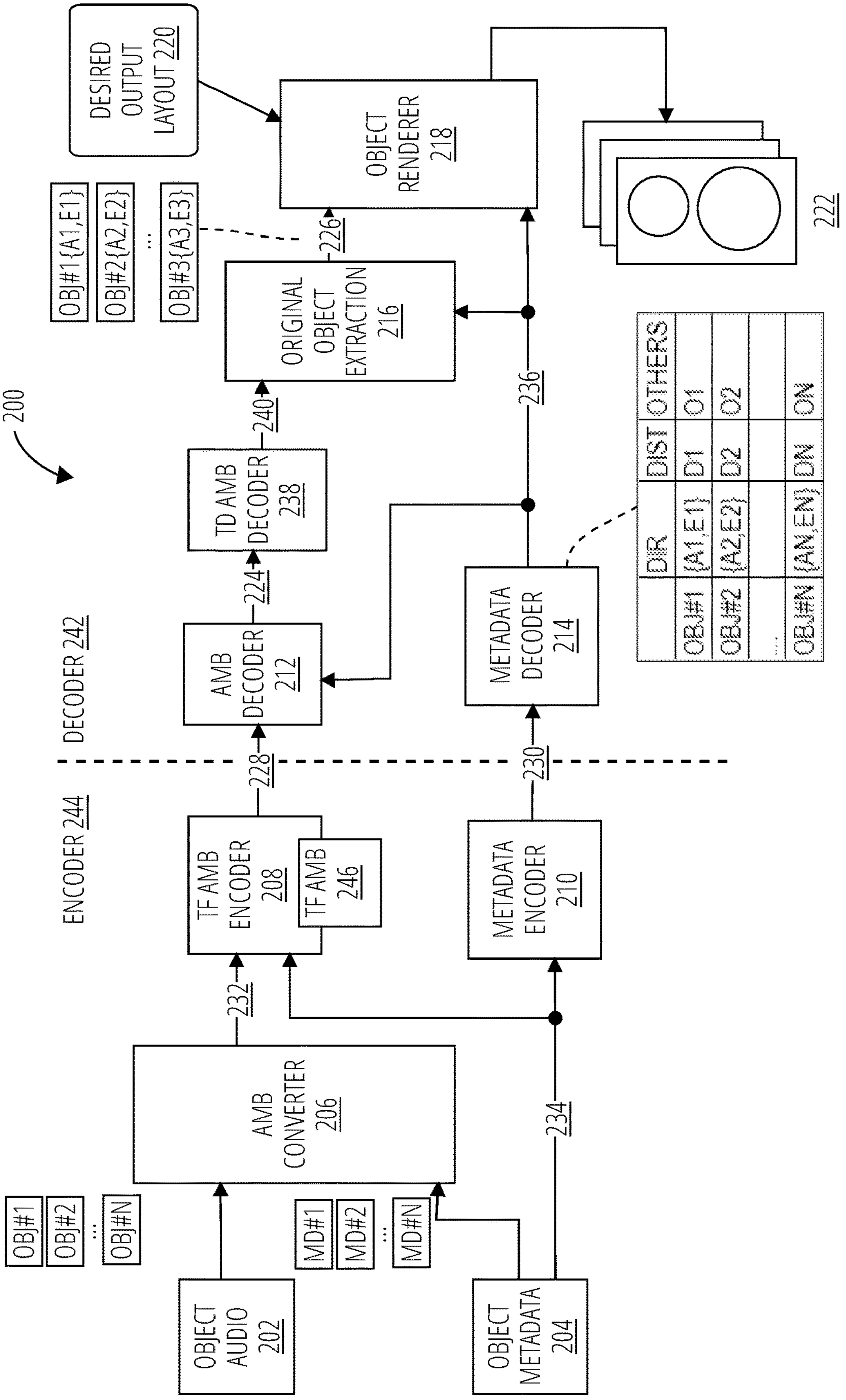
FIG. 2 illustrates an example system for coding object audio with a time-frequency domain Ambisonics audio format and time domain Ambisonics audio format, in accordance with some aspects.

FIG. 2 illustrates an example system 200 for coding object audio with a time-frequency domain Ambisonics audio format and time domain Ambisonics audio format, in accordance with some aspects. Some aspects may be performed as an encoder 244 and other aspects may be performed as decoder 242.

Encoder 244 may correspond to other examples of an encoder such as encoder 138 as described with respect to FIG. 1. For example, encoder 244 may obtain object audio 202 and metadata 204 that spatially describes the object audio 202. At block 206 and 208, encoder 244 may convert the object audio 202 to TF Ambisonics audio 246 based on the metadata 204 and a metadata subset 234. At blocks 208 and 210, the TF Ambisonics audio 246 and the metadata subset 234 of the metadata 204 are encoded as one or more bit streams (e.g., bit stream 228 and bit stream 230) to be stored in computer-readable memory or transmitted to a remote device.

Decoder 242 may correspond to other examples of a decoder such as decoder 140. In addition to the blocks discussed with respect to decoder 140 and FIG. 1, decoder 242 may also include a time domain Ambisonics decoder block 238. The decoder 242 may decode one or more bit streams such as bit stream 228 and bit stream 230 to obtain a TF Ambisonics audio and metadata 236, respectively. TF Ambisonics audio may correspond to or be the same as TF Ambisonics audio 246. Decoder 242 may extract object audio 226 from the TF Ambisonics audio 224 using the metadata 236 which spatially describes the object audio 226. Decoder 242 may render the object audio 226 with the metadata 236 based on a desired output layout 220 (speaker or acoustic transducer arrangement.)

As shown in this example, extracting the object audio 226 may include converting TF Ambisonics audio 224 to TD Ambisonics audio 240 at the block 238. The object audio 226 is extracted from the TD Ambisonics audio 240 using the metadata 236, at block 216. The TD Ambisonics audio may include a plurality of components, each component corresponding to a unique polar pattern. Depending on the resolution, the number of components may vary. The components may each include an audio signal that varies over time. TD Ambisonics audio 240 may also be referred to as Ambisonics audio or traditional Ambisonics. TD Ambisonics may not include time-frequency tiles like TF Ambisonics audio 246 and TF ambisonics audio 224.

A set (or multiple sets) of the audio signal of each object and metadata for each TF tile may be reconstructed (e.g., at blocks 212 and 214, respectively). These may be used to reconstruct the TD Ambisonics audio 240. TD Ambisonics audio 240 may correspond to TD Ambisonics audio 232. At block 214, a quantized version of the object metadata 204 may be reconstructed. Similarly, at block 216, a quantized version of the original object audio 202 may be extracted by using the TD Ambisonics audio 240 and the metadata 236. The object renderer 218 may synthesize a speaker or headphone output (e.g., output audio channels) based on the object audio 226, metadata 236, and the output layout 220. The resulting output audio channels may be used to drive speakers 222 to match the output channel layout.

In some aspects, a method may be performed with various aspects described, such as with respect to FIG. 2. The method may be performed by processing logic of an encoder 244 or decoder 242, other audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

In a method, processing logic may decode one or more bit streams (e.g., 228 and 230) to obtain a time-frequency domain Ambisonics audio 224 and metadata 236. Processing logic may extract object audio 226 from the time-frequency domain Ambisonics audio 224 using the metadata 236 which spatially describes the object audio 226. Extracting the object audio 226 may include converting the time-frequency domain Ambisonics audio to time domain Ambisonics audio 240 (e.g., at block 238), and extracting the object audio 226 from the time domain Ambisonics audio 240 using the metadata 236. Processing logic may render the object audio 226 with the metadata 236 based on the desired output layout 220.

Figure 3:
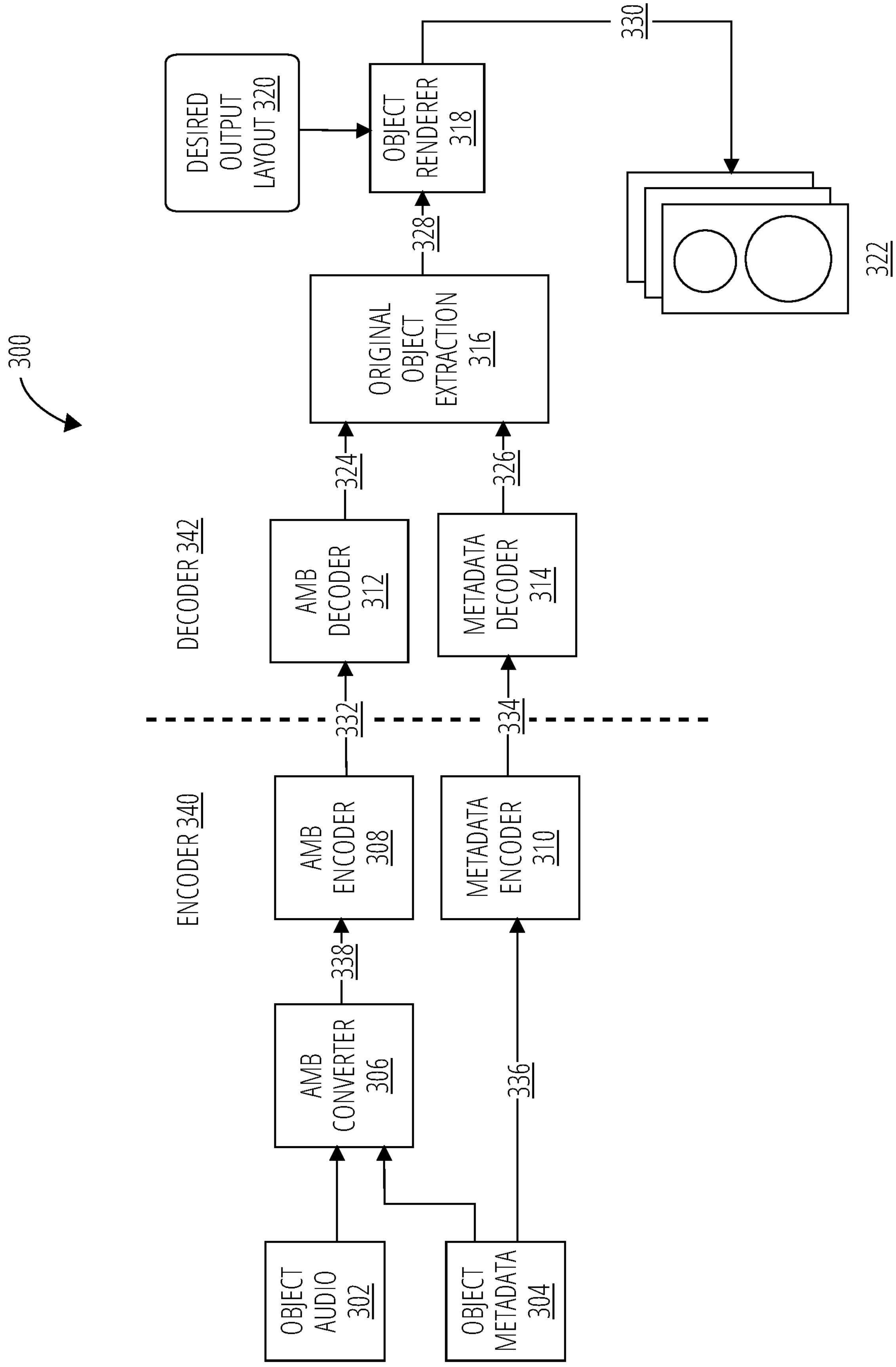
FIG. 3 illustrates an example system for coding object audio in an Ambisonics domain utilizing metadata, in accordance with some aspects.

FIG. 3 illustrates an example system for coding object audio in an Ambisonics domain utilizing metadata, in accordance with some aspects. Some aspects may be performed as an encoder 340 and other aspects may be performed as decoder 342. Encoder 340 may share features with other encoders described herein. Similarly, decoder 342 may share features with other decoders described herein.

In the system 300, object audio 302 is converted to Ambisonics (e.g., HOA). The system 300 encodes, decodes, and renders the object audio using object metadata 304. HOA, which is converted from the object audio, is encoded/decoded/rendered by using the object metadata 304.

At the encoder 340, one or more bit streams (e.g., 332 and 334) for both HOA and a subset of the original object metadata are generated and transmitted to the decoder 342. At the decoder 342, quantized version of HOA may be reconstructed, and a quantized version of the object metadata may be reconstructed. A quantized version of the object audio signals may be extracted using the reconstructed HOA and the reconstructed metadata. Object renderer block 318 may synthesize the audio channels 330 (loudspeaker output or headphone output) based on the extracted object audio signals, the reconstructed metadata, and the desired output layout 320.

In particular, encoder 340 may obtain object audio 302 and object metadata 304 that spatially describes the object audio 302. The object audio 302 may be referred to as original object audio, and object metadata 304 may be referred to as original object metadata.

At block 306, encoder 340 may convert the object audio 302 to Ambisonics audio (e.g., HOA) based on the object metadata 304. The object metadata 304 may describe spatial information such as a relative direction and distance between the object and a listener. At Ambisonics converter block 306, an audio signal of an object audio 302 may be translated to each Ambisonics component by spatially mapping the acoustic energy of the object's audio signal as described by the metadata, to the unique pattern of each component. This may be performed for each object of object audio 302, resulting in Ambisonics audio 338. Ambisonics audio 338 may be referred to as time domain Ambisonics audio (TD Ambisonics audio.) Depending on the distribution of audio objects in an audio scene, one or more of the components of TD Ambisonics audio 338 may have audio contributions from multiple objects in object audio 302. As such, the encoder 340 may apply the metadata 304 to map each object of object audio 302 to each component of the resulting Ambisonics audio 338. This process may also be performed in other examples to convert object audio to TD Ambisonics audio.

At block 308, the Ambisonics audio 338 is encoded in a first bit stream 332 as Ambisonics audio (e.g., TD Ambisonics audio). At block 310, a subset 336 of the metadata 304 is encoded in a second bit stream 334. Metadata 304 or its subset 336, or both, may include at least one of a distance or a direction that is specifically associated with an object of the object audio. Other spatial information may also be included.

The subset of the metadata may be used by a downstream device (e.g., decoder 342) to convert the Ambisonics audio in bitsream 332 back to the object audio 302 (or a quantized version of the object audio). In some examples, bit streams 332 and 334 are separate bit streams. In other examples, the bit streams may be combined (e.g., through multiplexing or other operation).

A decoder 342 may obtain one or more bit streams such as bit stream 332 and bit stream 334. At block 312, a first bit stream 332 may be decoded to obtain Ambisonics audio 324. Ambisonics audio 324 may correspond to or be the same as Ambisonics audio 338. In some examples, the decoder 342 may decode the bit stream 332 to reconstruct a quantized version of the Ambisonics audio 338.

At block 314, decoder 342 may decode a second bit stream 334 to obtain metadata 326. This metadata may correspond to or be the same as the metadata subset 336. In some aspects, a quantized version of the metadata subset 336 is reconstructed.

At block 316, object audio 328 is extracted from the Ambisonics audio 324 using the metadata 326 which spatially describes the object audio 328. Extracting the object audio 328 may include extracting acoustic energy from each component of the Ambisonics audio 324 according to the spatial locations indicated in the metadata 326 to reconstruct each object indicated in the metadata 326. The object audio 328 may be extracted directly from the Ambisonics audio 324 (e.g., TD Ambisonics audio) using the metadata 326. This extraction process may correspond to other examples as well. The object audio 328 may be a quantized version of the object audio 302.

At object renderer block 318, the object audio 328 may be rendered with the metadata based on a desired output layout 320. The object audio 328 may include individual audio signals for each object, as well as metadata 326 which may have portions that are associated with or specific to each corresponding one of the individual audio signals.

The resulting audio channels 330 may be used to drive speakers 322 to output sound that approximates or matches the original audio scene characterized by the original object audio 302 and original object metadata 304.

In numerous examples described, encoding data as a bit stream may include performing one or more encoding algorithms that pack the data into the bit stream according to a defined digital format. Similarly, decoding data such as Ambisonics audio and metadata from a bit stream may include applying one or more decoding algorithms to unpack the data according to the defined digital format.

In some aspects, a method may be performed with various aspects described, such as with respect to FIG. 3. The method may be performed by processing logic of an encoder 340 or decoder 342, other audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

In a method, processing logic may obtain object audio 302 and metadata 304 that spatially describes the object audio 302. Processing logic may convert the object audio 302 to Ambisonics audio 338 based on the metadata 304. Processing logic may encode, in a first bit stream 332, the Ambisonics audio 338. Processing logic may encode, in a second bit stream 334, the metadata 304 or a subset 336 of the metadata 304.

In another method, processing logic may decode a first bit stream 332 to obtain Ambisonics audio 324. Processing logic may decode a second bit stream 334 to obtain metadata 326. Processing logic may extract object audio 328 from the Ambisonics audio 324 using the metadata 326 which spatially describes the object audio 328. Processing logic may render the object audio 328 with the metadata 326 based on a desired output layout 320.

In some examples, objects with a higher priority may be encoded as a first Ambisonics audio. Objects without the higher priority may be encoded as a second Ambisonics audio with lower order than the first Ambisonics audio. The first Ambisonics audio may be encoded with bit stream 332, and the second Ambisonics audio may be encoded with a third bit stream (not shown). Priority based coding is further described with respect to FIG. 4.

Figure 4:
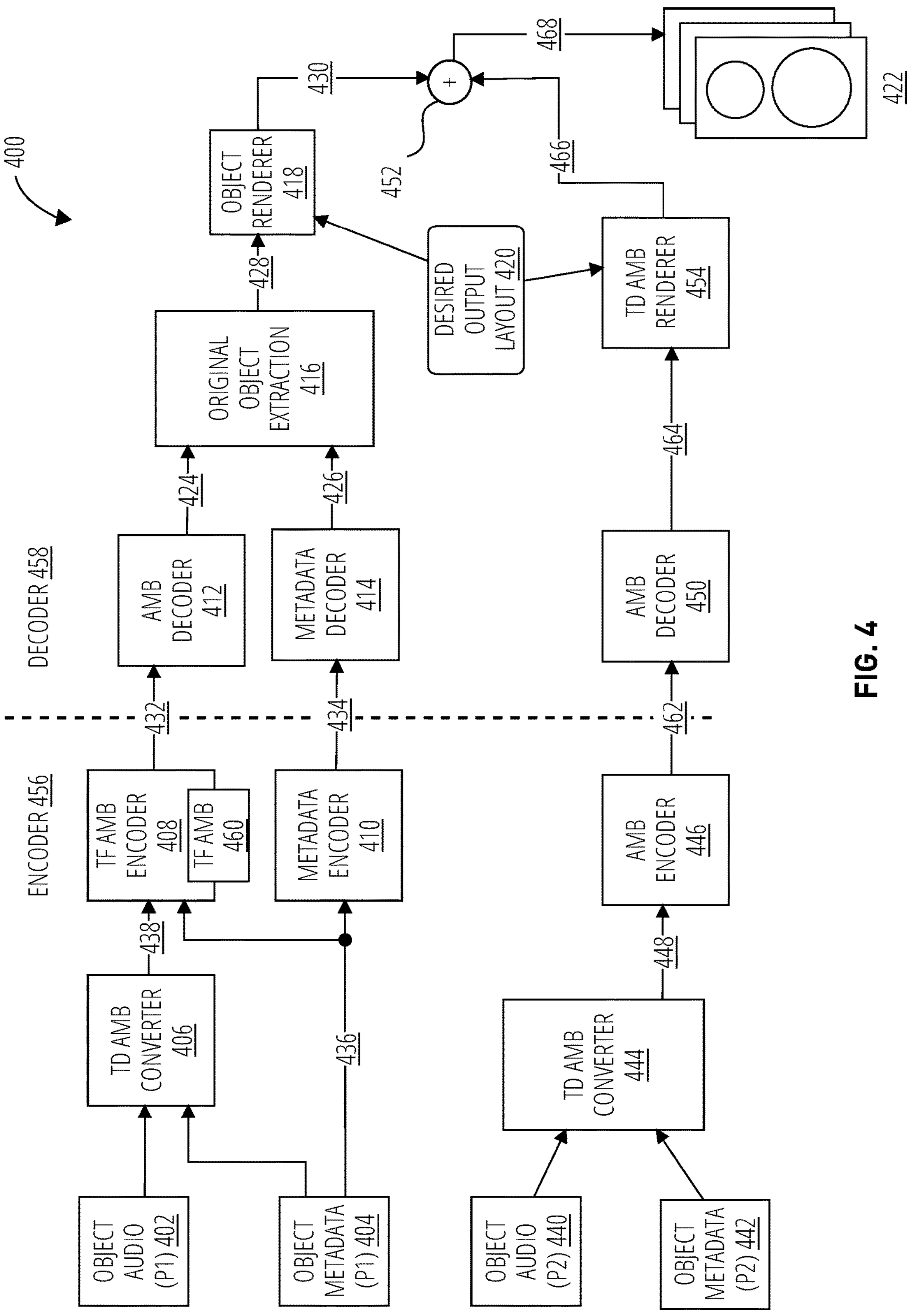
FIG. 4 illustrates an example system for coding object audio in an Ambisonics domain based on priority, in accordance with some aspects.

FIG. 4 illustrates an example system 400 for coding object audio in an Ambisonics domain based on priority, in accordance with some aspects. Some aspects may be performed as an encoder 456 and other aspects may be performed as decoder 458. Encoder 456 may share features with other encoders described herein. Similarly, decoder 458 may share features with other decoders described herein.

System 400 may include a mixed domain of object coding. Object audio may have objects with varying priority. Objects with a first priority level (e.g., a higher priority) may be converted, encoded, and decoded as TF Ambisonics audio. Objects with a second priority level (e.g., a lower priority) may be converted, encoded, and decoded as TD Ambisonics (e.g., HOA). Regardless of the priority level, the objects may be reconstructed at the decoder and summed together to produce final speaker or headphone output signals. Lower priority objects may be converted to a low resolution HOA (e.g., having lower order, e.g., up to first order Ambisonics). Higher priority objects may have a high resolution HOA (e.g., 6 order Ambisonics).

At encoder 456, object audio 402 may be obtained. Object audio 402 may be associated with a first priority (e.g., P1). In some examples, object audio 402 may be converted to TF Ambisonics audio 460 based on metadata 436 that spatially describes the object audio. For example, at block 406, the object audio 402 may be converted to TD Ambisonics audio 438 and then at block 408, the TD Ambisonics audio may be converted to TF Ambisonics audio 460.

At block 444, second object audio 440 may be converted to TD Ambisonics audio 448. The second object audio 440 may be associated with a second priority that is different from the first priority. For example, the first priority of object audio 402 may have a higher priority than second priority of object audio 440. Priority may be characterized by a value (e.g., a number), or enumerated types.

Object audio 402 and object audio 440 may be part of the same object audio (e.g., from the same audio scene). In some examples, an audio scene may indicate a priority for each object as determined during authoring of the audio scene. An audio authoring tool may embed the priority or a type of the object into the metadata. A decoder may obtain the priority of each object in the corresponding metadata of each object or derive the priority from the type that is associated with the object.

At block 408, the TF Ambisonics audio 460 may be encoded as a first bit stream 432. In other examples, rather than converting to TF Ambisonics audio, encoder 456 may encode the TD Ambisonics audio 438 as the first bit stream 432. At block 410, the metadata 436 that is associated with first object audio 402 may be encoded as a second bit stream 434. At block 446, the TD Ambisonics audio 448 may be encoded as a third bit stream 462. In some examples, in response to the priority of object audio 440 and its corresponding object metadata 442 not satisfying a threshold (e.g., indicating low priority), the object metadata 442 is not encoded or transmitted to decoder 458.

In some examples, encoder 456 may determine a priority of each object in object audio. If the priority satisfies a threshold (e.g., indicating a high priority), the object may be encoded as a first TF Ambisonics audio or first TD Ambisonics audio. If the priority does not satisfy a threshold, then the object may be encoded as a second TD Ambisonics audio, or second TD Ambisonics audio with a lower order than first TF Ambisonics audio or first TD Ambisonics audio, or both. In such a manner, lower priority objects may be encoded with lower spatial resolution. Higher priority objects may be encoded as TF Ambisonics audio or TD Ambisonics audio with a higher order and higher resolution.

At block 412, decoder 458 may decode a first bit stream 432 to obtain TF Ambisonics audio 460 (or TD Ambisonics audio 438). At block 414, a second bit stream 434 is decoded to obtain metadata 426. Metadata 426 may correspond to metadata 436. Metadata 426 may be the same as metadata 436 or a quantized version of metadata 426.

At block 450, a third bit stream 462 is decoded to obtain TD Ambisonics audio 464. TD Ambisonics audio 464 may correspond to or be the same as TD Ambisonics audio 448.

At block 416, object audio 428 is converted from the audio 424 which may be TF Ambisonics audio or TD Ambisonics audio. Decoder 458 may use the metadata 426 which spatially describes the object audio to extract the object audio 428, as described in other sections.

Decoder 458 may generate a plurality of output audio channels 468 based on the object audio 428 and the TD Ambisonics audio 464. Generating the plurality of output audio channels 468 may include rendering the object audio 428 at object renderer block 418 and rendering the TF Ambisonics audio 464 at TD Ambisonics renderer 454. The rendered object audio 430 and the rendered Ambisonics audio 466 may be combined (e.g., summed together) at block 452 into respective output audio channels 468, to generate the output audio channels 468. The object audio 430 and the TF Ambisonics audio 466 may be rendered based on a desired output layout 420.

The output audio channels 468 may be used to drive the speakers 422. Speakers 422 may be integral to decoder 458. In other examples, speakers 422 may be integral to one or more remote playback devices. For example, each of speakers 422 may be a standalone loudspeaker. In another example, each of speakers 422 may be integral to a playback device such as a speaker array, a headphone set, or other playback device.

In some aspects, a method may be performed with various aspects described, such as with respect to FIG. 4. The method may be performed by processing logic of an encoder 456 or decoder 458, other audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all of the blocks in the method may be performed.

In a method, processing logic may convert object audio 402 to TF domain Ambisonics audio 460 based on metadata 436 that spatially describes the object audio 402, wherein the object audio 402 is associated with a first priority. Processing logic may convert second object audio 440 to TD Ambisonics audio 448 wherein the second object audio is associated with a second priority that is different from the first priority.

Processing logic may encode the TF Ambisonics audio 460 as a first bit stream 432. Alternatively, processing logic may encode TD Ambisonics audio 438 (converted from the object audio 402) as the first bit stream 432. Processing logic encodes the metadata 404 as a second bit stream 434. Processing logic may encode the TD Ambisonics audio 448 (encoded from object audio 440) as a third bit stream 462. The first priority may be higher than the second priority.

In another method, processing logic may decode a first bit stream 432 to obtain TF Ambisonics audio which may correspond to TF Ambisonics audio 460. Alternatively, processing logic may decode the first bit stream 432 to obtain TD Ambisonics audio which may correspond to TD Ambisonics audio 438. This may depend on whether the encoder 456 encoded the TF Ambisonics audio or the TD Ambisonics audio as the first bit stream 432. The resulting decoded audio 424 may correspond to object audio 402 which may be associated with a first priority. Processing logic may decode a second bit stream 434 to obtain metadata 426. Metadata 426 may correspond to object metadata 436 which may be associated with object audio 402. Processing logic may decode a third bit stream 462 to obtain TD Ambisonics audio 464. TD Ambisonics audio 464 may correspond to object audio 440 which may be associated with a second priority which may be different than the first priority. Processing logic may extract object audio 428 from audio 424 which may be TF Ambisonics audio or TD Ambisonics audio, using the metadata 426 which spatially describes the object audio 428. Processing logic may generate a plurality of output audio channels 468 based on the object audio 428 (which is associated with the first priority) and the TD Ambisonics audio 464 (which is associated with the second priority).

In some aspects, multiple priority levels may be supported. For example, objects with priority 1 (the lowest priority) may be encoded as a first Ambisonics audio. Objects with priority 3 (a higher priority) may be encoded with a second Ambisonics audio with higher order than the first Ambisonics audio. Objects with priority 5 (higher than priority 1 and 3) may be encoded as a third Ambisonics audio with higher order than the first Ambisonics audio and the second Ambisonics audio, and so on.

FIG. 5 shows an example of time-frequency domain Ambisonics audio, in accordance with some aspects. The TF Ambisonics audio may correspond to various of the examples described. Time-frequency domain (TF) Ambisonics audio may include time-frequency tiling of traditional Ambisonics audio which may be referred to as time domain Ambisonics audio. The time-frequency domain Ambisonics audio may correspond to or characterize object audio 512.

Object audio 512 may include a plurality of frames such as frame 508, frame 510, and so on. Each frame may include a time-varying chunk of each audio signal of each object, and metadata of each object. For example, a second of audio may be divided into 'X' number of frames. The audio signal of each object, as well as the metadata for each object, may change over time (e.g., from one frame to another).

Traditionally, Ambisonics audio such as HOA includes a plurality of components, where each of those components may represent a unique polar pattern and direction of a microphone. The number of components increases as the order of the Ambisonics audio format increases. Thus, the higher the order, the higher the spatial resolution of the Ambisonics audio. For example, B-format Ambisonics (having up to a third order) has 16 components, each having a polar pattern and direction that is unique. The audio signal of each component may vary over time. As such, traditional Ambisonics audio format may be referred to as being in the time domain, or time domain (TD) Ambisonics audio.

As described in numerous examples, traditional Ambisonics audio may be converted to time-frequency Ambisonics audio that includes metadata of object audio, using time-frequency analysis. A time-frequency representation characterizes a time domain signal across both time and frequency. Each tile may represent a sub-band or frequency range. Processing logic may generate TF Ambisonics audio by converting the object audio 512 to TD Ambisonics using object metadata (e.g., metadata 516, 520). Processing logic may perform tile-frequency analysis to divide the components of the TD Ambisonics audio into tiles and embed the spatial information of the metadata in each tile, depending on which objects contribute to that tile. The TF Ambisonics audio may be converted back to object audio by using the same spatial information or a subset of the spatial information to perform the reverse operation.

TF Ambisonics audio may include a plurality of time-frequency tiles such as 502*a*, 502*b*, 502*c*, 502*d*, 502*e*, 502*f*, 502*g*, and so on. Each tile of the plurality of time-frequency tiles may represent audio in a sub-band of an Ambisonics component. TF tile 502*a* may represent audio in a sub-band ranging from frequency A to frequency B in component A. The audio in tile 502*a* may represent a contribution of each of the objects 514 as spatially picked up by the polar pattern and direction of component A in that sub-band (from frequency A to frequency B). Each tile may have contribution from different combinations of objects, depending on how the objects are spatially distributed in the sound field relative to the component, and the acoustic energy of the object.

For example, tile 502*b* may include contributions from one or more of the objects 514. Tile 502*e* may have contribution from a separate set of objects 514. Some tiles may not have contribution from any objects. In this example, the tiles 502*a*-502*e* may have different frequency ranges in component A. Each component such as component A, component B, and so on, may have its own set of tiles. For example, tile 502*f* and tile 502*e* may cover the same frequency band, but for different components.

Further, each tile of the plurality of time-frequency tiles may include a portion of the metadata that spatially describes a corresponding portion of the object audio in the tile. For example, if tile 502*f* includes contributions from one or more of the objects 514 (e.g., a chirping bird), metadata 516 that corresponds to the chirping bird may be included in tile 502*f* with the audio contribution of the chirping bird. The metadata may identify the object (e.g., with an object ID), and/or provide spatial information about the bird. This may improve mapping from TF Ambisonics audio back to object audio.

Further, the TD Ambisonics audio may include a set of the plurality of time-frequency tiles that corresponds to an audio frame of the object audio. The set of tiles may cover each of the sub-bands and each of the components of the TF Ambisonics audio. For example, a set 504 of time-frequency tiles may include a tile for each sub-band for each component. The set 504 may correspond to or characterize a portion or a frame of object audio 512, such as frame 508. Another set 506 of time-frequency tiles may correspond to or characterize a subsequent portion of the object audio 512 (e.g., at the next frame 510). The set 506 may have tiles that each cover each of the same sub-bands and components as prior sets. For example, tile 502*g* may cover the same sub-band and same component as tile 502*a* in the set 504. As such, each set may represent a temporal dimension, and each tile in a set may represent a different component or sub-band.

For example, in the set 504, object x and object y may contribute audio in sub-band 1, component A. In tile 502*a*, object audio from object x and object y may be represented in the audio signal of 502*a*, along with metadata 516 that identifies and spatially describes object x and object y. In the set 506, tile 502*g* may also represent sub-band 1, component A, but characterizing a different time of object audio 512.

Further, the object contributions in each tile may change from one set to another due to changes in the object's audio signal over time, or the location of each object, or both. For example, if object y became quieter or moved from frame

508 to frame 510, then tile 502*g* may contain object x but not object y, or less of object y. Metadata 516, 520, may change from frame to frame to represent the change in spatial information of each object over time. Similarly, objects 514 and objects 518 may change from frame to frame to represent the change in audio signal of an object over time.

Figure 6:
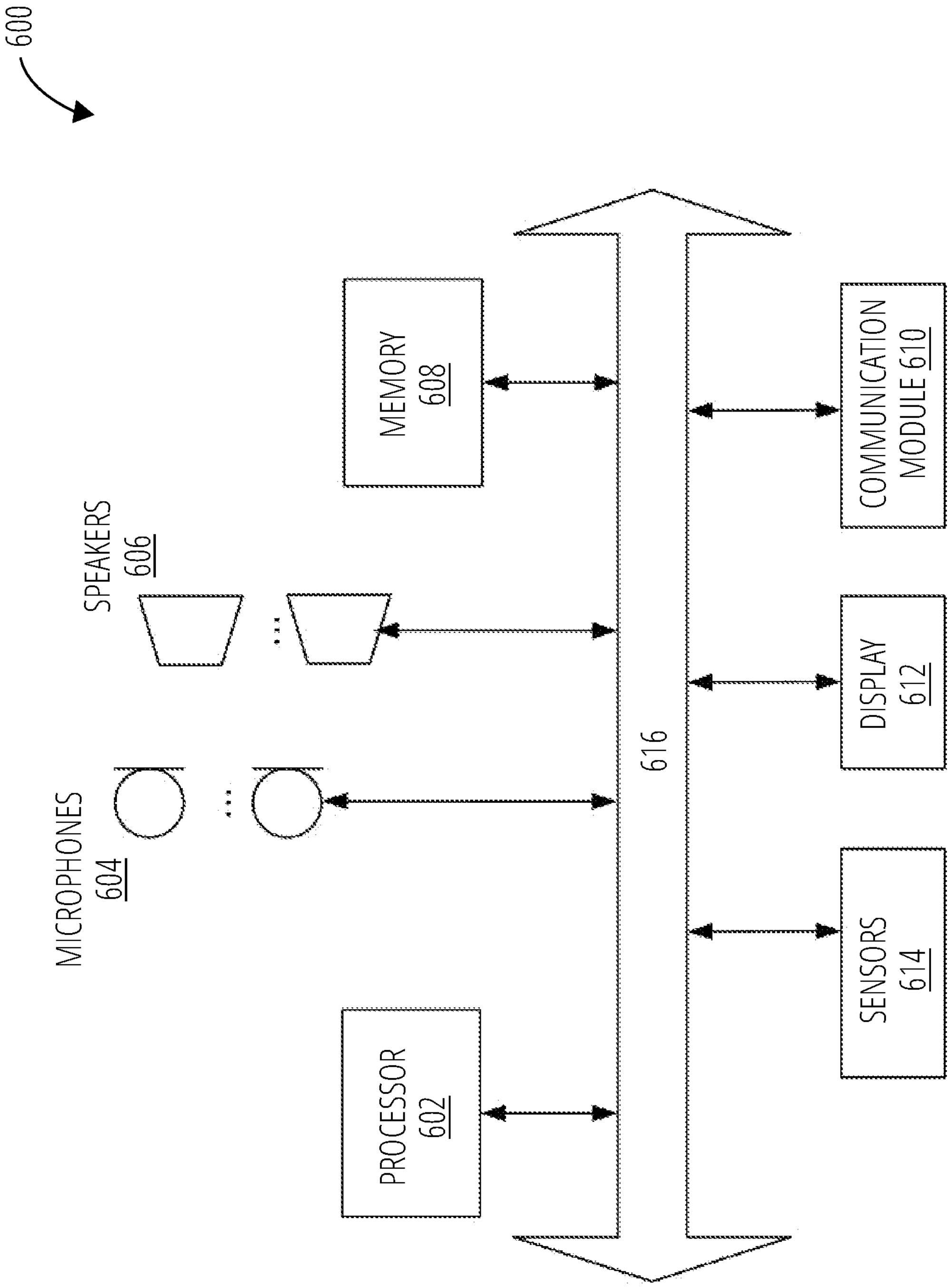
FIG. 6 illustrates an example of an audio processing system, in accordance with some aspects.

FIG. 6 illustrates an example of an audio processing system 600, in accordance with some aspects. The audio processing system may operate as an encoder and/or a decoder as described in the numerous examples. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any particular architecture or manner of interconnecting the components as such details are not germane to the aspects herein. It will also be appreciated if other types of audio processing systems that have fewer or more components than shown can also be used. Accordingly, the processes described herein are not limited to use with the hardware and software shown.

The audio processing system can include one or more buses 616 that serve to interconnect the various components of the system. One or more processors 602 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 608 can include Read Only Memory (ROM), volatile memory, and non-volatile memory, or combinations thereof, coupled to the bus using techniques known in the art. Sensors 614 can include an IMU and/or one or more cameras (e.g., RGB camera, RGBD camera, depth camera, etc.) or other sensors described herein. The audio processing system can further include a display 612 (e.g., an HMD, or touchscreen display).

Memory 608 can be connected to the bus and can include DRAM, a hard disk drive or a flash memory or a magnetic optical drive or magnetic memory or an optical drive or other types of memory systems that maintain data even after power is removed from the system. In one aspect, the processor 602 retrieves computer program instructions stored in a machine readable storage medium (memory) and executes those instructions to perform operations described herein of an encoder or a decoder.

Audio hardware, although not shown, can be coupled to the one or more buses in order to receive audio signals to be processed and output by speakers 606. Audio hardware can include digital to analog and/or analog to digital converters. Audio hardware can also include audio amplifiers and filters. The audio hardware can also interface with microphones 604 (e.g., microphone arrays) to receive audio signals (whether analog or digital), digitize them when appropriate, and communicate the signals to the bus.

Communication module 610 can communicate with remote devices and networks through a wired or wireless interface. For example, communication modules can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any particular source for the instructions executed by the audio processing system.

In the description, certain terminology is used to describe features of various aspects. For example, in certain situations, the terms "decoder," "encoder," "converter," "renderer," "extraction," "combiner," "unit," "system," "device," "filter," "block," "component", may be representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities.

Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A computer-implemented method, comprising:

obtaining object audio and metadata that spatially describes the object audio, wherein the object audio and the metadata characterize an original audio scene;

converting the object audio to Ambisonics audio based on the metadata;

encoding, in a first bit stream, the Ambisonics audio;

encoding, in a second bit stream, at least a subset of the metadata; and transmitting the first and second bit streams to a decode side where the first and second bit streams are then decoded and the Ambisonics audio is rendered into a plurality of audio channels that match the original audio scene characterized by the object audio and the metadata.

2. The method of claim 1 wherein encoding at least the subset of the metadata includes encoding less than all of the metadata in the second bit stream.

3. The method of claim 2 wherein the metadata is used by a decoder to convert the Ambisonics audio to the object audio.

4. The method of claim 3 wherein the Ambisonics audio is time domain Ambisonics audio.

5. The method of claim 4 wherein the metadata includes at least one of a direction of an object relative to a listening position, a distance of the object relative to the listening position, or position of the object relative to the listening position.

6. The method of claim 5 wherein converting the object audio to the Ambisonics audio based on the metadata includes mapping a contribution or acoustic energy of each object in the object audio to each component in the Ambisonics audio using spatial information in the metadata.

7. A computer-implemented method, comprising:

decoding a first bit stream to obtain Ambisonics audio that characterizes an original audio scene;

decoding a second bit stream to obtain a subset of original metadata which spatially describes original object audio, wherein the original object audio also characterizes the original audio scene;

extracting object audio from the Ambisonics audio using the subset of original metadata which spatially describes the original object audio; and rendering the extracted object audio with the subset of original metadata based on a desired output layout into a plurality of audio channels that also characterize the original audio scene.

8. The method of claim 7, wherein the object audio is extracted directly from the Ambisonics audio using the subset of original metadata.

9. The method of claim 8 wherein extracting the object audio includes reconstructing a quantized version of the Ambisonics audio and extracting the object audio from the quantized version of the Ambisonics audio.

10. The method of claim 8 wherein extracting the object audio includes reconstructing a quantized version of the subset of original metadata and extracting the object audio from the Ambisonics audio using the quantized version of the subset of original metadata.

11. The method of claim 8 wherein rendering the extracted object audio with the subset of original metadata includes rendering a quantized version of the extracted object audio based on a quantized version of the subset of original metadata and the desired output layout.

12. The method of claim 7 wherein the Ambisonics audio is obtained, when decoding the first bit stream, as a time domain Ambisonics audio.

13. The method of claim 7 wherein the subset of original metadata includes at least one of a direction of an object relative to a listening position, a distance of the object relative to the listening position, or position of the object relative to the listening position.

14. The method of claim 7 wherein the subset of original metadata was used by an encode side process to convert the original object audio into the Ambisonics audio, before encoding the Ambisonics audio in the first bit stream.

15. A computer-implemented method, comprising:

converting first object audio to time-frequency domain Ambisonics audio based on metadata that spatially describes the first object audio, wherein the first object audio is associated with a first priority;

converting second object audio to time domain Ambisonics audio wherein the second object audio is associated with a second priority that is different from the first priority;

encoding the time-frequency domain Ambisonics audio as a first bit stream;

encoding the metadata as a second bit stream; and encoding the time domain Ambisonics audio as a third bit stream.

16. The method of claim 15 wherein the first priority has a higher priority than the second priority.

17. The method of claim 16 wherein the time domain Ambisonics audio is encoded with a lower resolution than the time-frequency domain Ambisonics audio.

18. The method of claim 17 wherein the time-frequency domain Ambisonics audio includes a plurality of time-frequency tiles, each tile of the plurality of time-frequency tiles representing audio in a sub-band of an Ambisonics component.

* * * * *